(12) United States Patent
McGrogan (10) Patent No.: US 8,560,144 B2
(45) Date of Patent: Oct. 15, 2013

(54) OUTPUT TORQUE RATE LIMITING BASED ON A REQUEST BUSYNESS INDICATOR THAT CONSIDERS THE RECENT TIME HISTORY OF THE OUTPUT TORQUE REQUEST

(75) Inventor: Sean W. McGrogan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 140 days.

(21) Appl. No.: 13/162,767

(22) Filed: Jun. 17, 2011

(65) Prior Publication Data

US 2012/0323401 A1    Dec. 20, 2012

(51) Int. Cl.
   G05D 1/00    (2006.01)
   B60T 7/12    (2006.01)
   B60W 10/00   (2006.01)
   G01M 15/00   (2006.01)

(52) U.S. Cl.
   USPC .... 701/1; 701/89; 477/86; 477/87; 73/115.01

(58) Field of Classification Search
   USPC ............... 701/22; 477/86, 87; 73/115.01
   See application file for complete search history.

(56) References Cited

U.S. PATENT DOCUMENTS

| | | | | |
|---|---|---|---|---|
| 6,178,943 B1* | 1/2001 | Taga et al. | | 123/295 |
| 6,278,915 B1* | 8/2001 | Deguchi et al. | | 701/22 |
| 6,330,504 B1* | 12/2001 | Toukura et al. | | 701/54 |
| 7,236,873 B2* | 6/2007 | Kuang et al. | | 701/110 |
| 7,275,518 B1* | 10/2007 | Gartner et al. | | 123/406.23 |
| 7,715,972 B2* | 5/2010 | Kuge | | 701/96 |
| 7,987,934 B2* | 8/2011 | Huseman | | 180/65.21 |
| 2005/0023058 A1* | 2/2005 | Gebby et al. | | 180/69.6 |
| 2008/0119319 A1* | 5/2008 | Kaya et al. | | 477/3 |
| 2008/0308066 A1* | 12/2008 | Martin et al. | | 123/403 |
| 2009/0043428 A1* | 2/2009 | Matsunaga et al. | | 701/1 |
| 2009/0288634 A1* | 11/2009 | Takizawa et al. | | 123/349 |

OTHER PUBLICATIONS

U.S. Appl. No. 13/029,381, Michael Arnett.
U.S. Appl. No. 13/160,937, Jy-Jen F. Sah.
U.S. Appl. No. 13/160,908, Sean W. McGrogan.
U.S. Appl. No. 13/161,584, Sean W. McGrogan.
U.S. Appl. No. 13/161,602, Jy-Jen F. Sah.
U.S. Appl. No. 13/152,380, Michael Arnett.
U.S. Appl. No. 13/162,720, Ryan D. Martini.
U.S. Appl. No. 13/163,668, Anthony H. Heap.
U.S. Appl. No. 13/163,115, Jy-Jen F. Sah.

* cited by examiner

*Primary Examiner* — Thomas Black
*Assistant Examiner* — Tyler Paige (57) ABSTRACT

A method for controlling torque in a vehicle including monitoring a plurality of factors associated with an output torque request in response to an output torque request rate of change exceeding a predetermined threshold, and controlling rate limiting of a delivered output torque to achieve the output torque request rate of change based on the plurality of factors associated with the output torque request.

17 Claims, 3 Drawing Sheets

OUTPUT TORQUE RATE LIMITING BASED ON A REQUEST BUSYNESS INDICATOR THAT CONSIDERS THE RECENT TIME HISTORY OF THE OUTPUT TORQUE REQUEST

TECHNICAL FIELD

This disclosure is related to controlling torque in a powertrain.

BACKGROUND

The statements in this section merely provide background information related to the present disclosure. Accordingly, such statements are not intended to constitute an admission of prior art.

Powertrains can utilize a variety of energy sources to provide energy to a torque generative device of the powertrain. Electrical energy can be stored in an energy storage device and the electrical energy can be used to provide motive or propelling torque to the powertrain through the torque generative device.

Powertrains can utilize more than a single source of energy. For example, an electric drive powertrain and a hybrid drive powertrain can utilize electrical energy through a motor or motors and petroleum energy though an exemplary gasoline or diesel internal combustion engine. Other sources of energy are known including fuel cells and biodiesel or E85 engines.

The powertrain is often unable to immediately deliver output torque in response to instantaneous output torque requests. The operator can experience an undesirable jarring effect if the delivered output torque is suddenly increased/decreased after a period of time. In other words, a sudden change in the delivered output torque is acceptable to the operator if the operator torque request changed recently. The longer it has been since the operator's request changed, the less acceptable it is to change delivered output torque too quickly.

SUMMARY

A method for controlling torque in a vehicle including monitoring a plurality of factors associated with an output torque request in response to an output torque request rate of change exceeding a predetermined threshold, and controlling rate limiting of a delivered output torque to achieve the output torque request rate of change based on the plurality of factors associated with the output torque request.

BRIEF DESCRIPTION OF THE DRAWINGS

One or more embodiments will now be described, by way of example, with reference to the accompanying drawings, in which.

DETAILED DESCRIPTION

Figure 1:
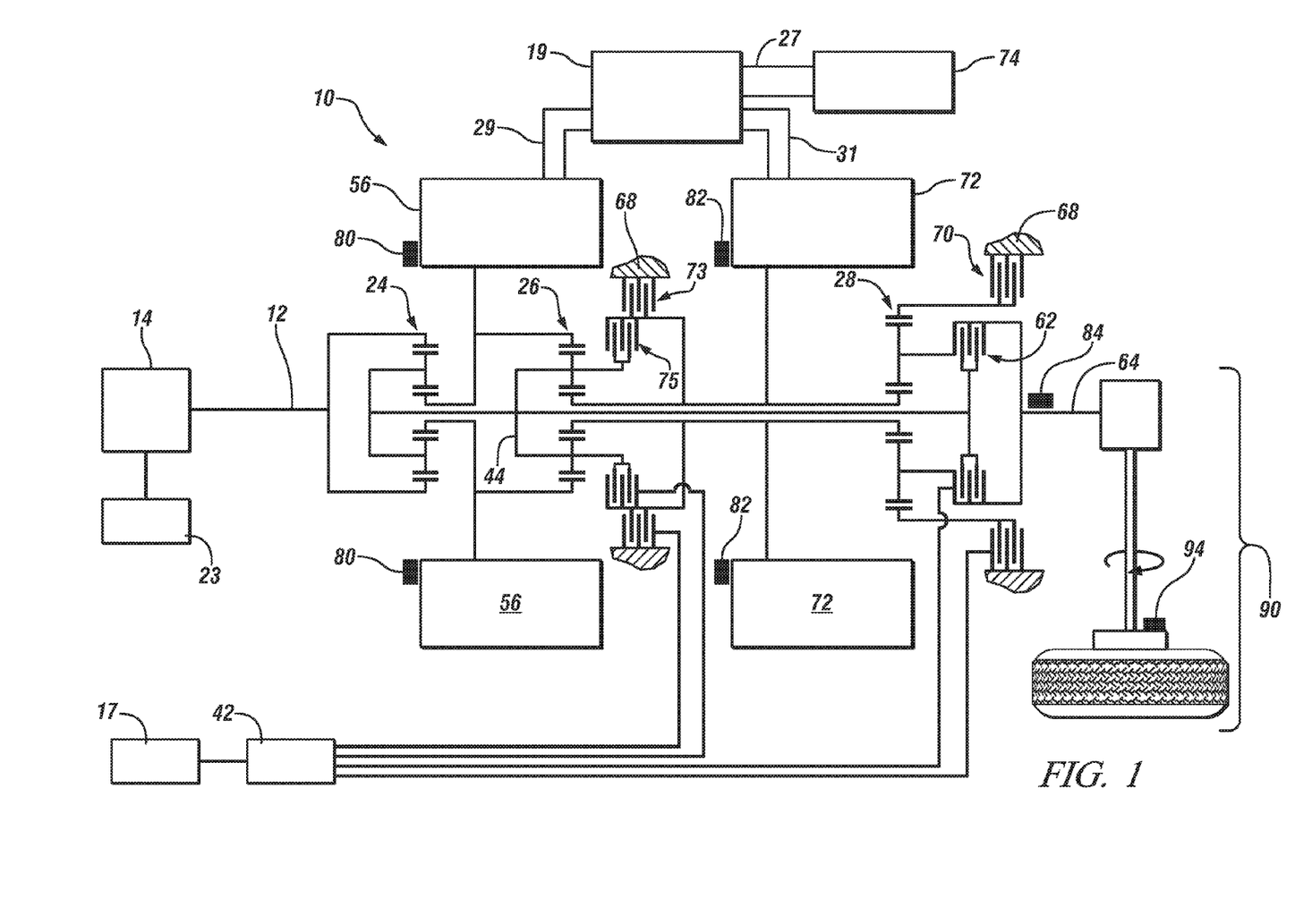
FIG. 1 illustrates an exemplary hybrid drive powertrain including an engine, transmission, driveline, control system, and hydraulic control circuit, in accordance with the present disclosure.

Referring now to the drawings, wherein the showings are for the purpose of illustrating certain exemplary embodiments only and not for the purpose of limiting the same, FIG. 1 illustrates an exemplary hybrid drive powertrain including an engine 14, transmission 10, driveline 90, control system, and hydraulic control circuit. Such an exemplary hybrid drive powertrain includes a plurality of torque generative devices operable in a powersplit mode wherein the various torque generative devices can selectively and cooperatively contribute torque to the powertrain. The transmission 10 includes an input shaft 12 having an input speed, $N_I$ that can be driven by the internal combustion engine 14, and an output shaft 64 having an output rotational speed, $N_O$. The rotational speed of the output shaft 64 can be monitored using a sensing system 84.

The exemplary engine 14 includes a multi-cylinder internal combustion engine selectively operative in several states to transmit torque to the transmission via shaft 12, and can be either a spark-ignition or a compression-ignition engine. The engine 14 has a crankshaft having speed $N_E$ which is operatively connected to the transmission input shaft 12. The output of the engine, including speed $N_E$ and output torque $T_E$ can differ from transmission input speed $N_I$ and engine input torque $T_I$ when a torque management device is placed therebetween.

The transmission 10 utilizes three planetary gear sets 24, 26 and 28, and four torque-transmitting devices, i.e., clutches C1 70, C2 62, C3 73, and C4 75. An electro-hydraulic control system 42, preferably controlled by transmission control module (TCM) 17, is operative to control actuation and deactivation of the clutches. Clutches C2 and C4 can include hydraulically-actuated rotating friction clutches. Clutches C1 and C3 can include hydraulically-actuated stationary devices grounded to the transmission case 68. Each clutch can be hydraulically actuated, receiving pressurized hydraulic fluid from a pump via an electro-hydraulic control circuit.

A first electric machine includes a motor 56, referred to as MG-A, and a second electric machine includes a motor 72, referred to as MG-B, operatively connected to the transmission via the planetary gears. Each of the machines includes a stator, a rotor, and a resolver assembly 80, 82. The stator for each machine is grounded to outer transmission case 68, and includes a stator core with coiled electrical windings extending therefrom. The rotor for MG-A 56 is supported on a hub plate gear that is operably attached to output shaft 60 via carrier 26. The rotor for MG-B 72 is attached to sleeve shaft hub 66. The resolver assemblies 80, 82 are appropriately positioned and assembled on MG-A 56 and MG-B 72. Each resolver assembly 80, 82 includes a known variable reluctance device including a resolver stator, operably connected to the stator of each electric machine, and a resolver rotor, operably connected to the rotor of each electric machine. Each resolver 80, 82 includes a sensing device adapted to sense rotational position of the resolver stator relative to the resolver rotor, and identify the rotational position. Signals output from the resolvers are interpreted to provide rotational speeds for MG-A 56 and MG-B 72, NA and NB respectively. Transmission output shaft 64 is operably connected to a vehicle driveline 90 to provide motive output torque, $T_O$ to vehicle wheels. The driveline 90 includes a transfer case 96 having a known axle ratio, which transmits torque to vehicle drive wheels. Each wheel of the vehicle, can have a wheel speed sensing system 94 including one or more speed sensing devices mounted at the wheel and adapted to measure rotational speed of the respective wheel, including right-front (RF), right-rear (RR), left-front (LF), and left-rear (LR) wheels. The output of each wheel speed sensing system 94 is monitored by a brake control module.

The transmission 10 receives input torque from the torque-generative devices, including the engine 14, and MG-A 56 and MG-B 72, referred to as $T_I$, $T_A$, and $T_B$ respectively, as a result of energy conversion from fuel or electrical potential stored in an electrical energy storage device (ESD) 74. The ESD 74 is high voltage DC-coupled to transmission power inverter module (TPIM) 19 via DC transfer conductors 27. The TPIM 19 is an element of the control system. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality. Preferably, MG-A 56 and MG-B 72 are three-phase AC machines each having a rotor operable to rotate within a stator that is mounted on a case of the transmission. The inverters include known complementary three-phase power electronics devices.

The exemplary hybrid powertrain selectively operates in one of several states that can be described in terms of engine states including one of an engine-one state (ON) and an engine-off state (OFF), and transmission operating range states including a plurality of fixed gears and continuously variable operating modes, described with reference to Table 1, below.

TABLE 1

| Description | Engine State | Transmission Operating Range State | Applied Clutches |
|---|---|---|---|
| M1_Eng_Off | OFF | EVT Mode 1 | C1 70 |
| M1_Eng_On | ON | EVT Mode 1 | C1 70 |
| G1 | ON | Fixed Gear Ratio 1 | C1 70 C4 75 |
| G2 | ON | Fixed Gear Ratio 2 | C1 70 C2 62 |
| M2_Eng_Off | OFF | EVT Mode 2 | C2 62 |
| M2_Eng_On | ON | EVT Mode 2 | C2 62 |
| G3 | ON | Fixed Gear Ratio 3 | C2 62 C4 75 |
| G4 | ON | Fixed Gear Ratio 4 | C2 62 C3 73 |

The exemplary hybrid drive powertrain of FIG. 1 can utilize various combinations of engine 14 and motors 56 and 72 to provide torque to the powertrain. The exemplary hybrid drive powertrain can be described as a two mode hybrid, wherein two electrically variable gear modes or states (EVT Mode 1 (M1) and EVT Mode 2 (M2)) are possible. EVT Mode 1 and EVT Mode 2 utilize operation of transmission 10 and associated the planetary gear sets 24, 26, and/or 28 along with selective operation of associated clutches C1 70, C2 62, C3 73 and C4 75 and motors 56 and 72 to enable a variable ratio of $N_I$ to $N_O$. An embodiment of EVT Mode 1 includes using one of motors 56 and 72 to provide torque to the powertrain to drive output shaft 64, while the engine 14 can be utilized separately to drive the other motor as a generator and provide electrical energy to the energy storage device 74. Another embodiment of EVT Mode 1 includes using one of motors 56 and 72 to provide output torque to output shaft 64 while the engine is turned off and stationary. An embodiment of EVT Mode 2 includes utilizing all of engine 14 and motors 56 and 72 to simultaneously provide torque to output shaft 64.

Another exemplary embodiment of EVT Mode 2 includes utilizing one or both of motors 56 and 72 to provide torque to output shaft 64 while turning off engine 14 and allowing the engine to spin freely. In some embodiments, engine 14 can be operated to open all associated exhaust and intake valves to reduce pumping losses associated with spinning the engine while the engine is un-fueled. Another exemplary embodiment of EVT Mode 2 includes utilizing motors 56 and 72 to simultaneously provide torque to output shaft 64 while actively maintaining the engine speed equal to or near zero. Hybrid drive powertrains can take a number of embodiments, and a number of control schemes and resulting torque configurations can be achieved, and the disclosure is not intended to be limited to the exemplary embodiments provided herein.

Figure 2:
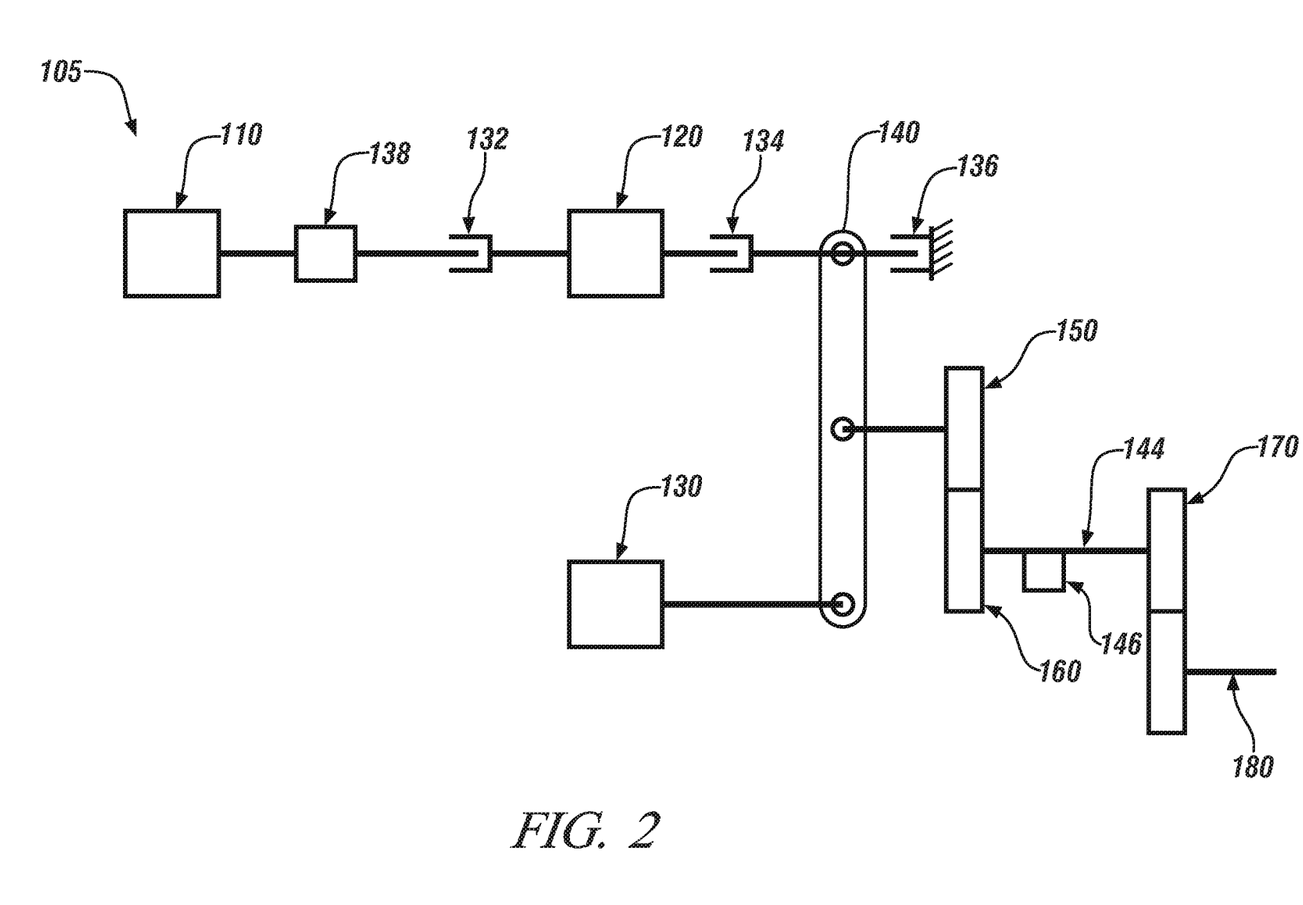
FIG. 2 illustrates an exemplary electric drive powertrain including a motor and an engine, in accordance with the present disclosure.

FIG. 2 illustrates an exemplary electric drive powertrain including a motor and an engine operable as a range extender. Alternatively, the engine can be operable to provide torque to the powertrain for the purpose of driving the output shaft. Exemplary powertrain 105 includes an internal combustion engine 110 functioning as a range extender, a first electric motor 120, a second electric motor 130, a planetary gear set 140, transfer gears 150, 160, and 170, and an output shaft 180. Powertrain 105 can be operated in any of a number of configurations based upon selective operation of engine 110 and motors 120 and 130. Further, powertrain 105 includes clutches 132, 134, and 136 which can be engaged or disengaged to change the configuration of the powertrain. Clutch 132 selectively engages engine 110 to motor 120. Clutch 134 selectively engages motor 120 to a gear of the planetary gear set 140. Clutch 136 selectively grounds the same gear of planetary gear set 140. Transmission output speed sensor 146 is depicted monitoring a speed of shaft 144 between transfer gears 160 and 170. Damper clutch 138 is depicted between engine 110 and motor 120 to provide a damping or smoothing of the interaction between the engine and the motor.

The exemplary electric drive powertrain selectively operates in one of several states including a fixed gear state and continuously variable operating modes, described with reference to Table 2, below.

TABLE 2

| Description | Transmission Operating Range State | Applied Clutches |
|---|---|---|
| N1 | Neutral | |
| N2 | Neutral | C3 132 |
| Mode 1 (M1) | 1 motor EV | C1 136 |
| Mode 2 (M2) | 2 motor EV | C2 134 |
| Mode 3 (M3) | Mode 1 | C1 136 C3 132 |
| Mode 4 (M4) | Mode 2 | C2 134 C3 132 |
| G1 | Gear 1 during Shifting | C1 136 C2 134 |

Motors 120 and 130 can supply torque to powertrain 105. According to one exemplary embodiment, engine 110 can be used to provide torque to motor 120 for the purpose of regenerating an energy storage device supplying electrical energy to motors 120 and/or 130. In such a function, supplying torque for a purpose of regeneration rather than supplying torque to the powertrain for the purpose of driving the output shaft, powertrain 105 can be described as an electric drive powertrain and engine 110 can be described as a range extender. According to another exemplary embodiment, the engine 110 can be used to provide torque to the powertrain for the purpose of driving the output shaft in combination with one of the motors 120 or 130. In a non-limiting example, a wide open accelerator pedal (WOP) shift from M4 to M3 requires the shift to be sequenced as M4-M2-G1-M1-M3, where selected combinations of clutches C1, C2 and C3 can be engaged during the shift, as described with reference to Table 2, above. When the powertrain 105 enters Gear 1, the maximum amount of output torque capability of the powertrain increases suddenly. However, in some circumstances there may be a period of delay between the time the operator went WOP and the powertrain enters G1, and thus, an undesirable jarring output torque can be felt by the operator if the powertrain delivers all the output torque it is capable of delivering. This period of delay can be referred to as "dead pedal." Methods disclosed herein control a delivered output torque time rate of change (i.e., rate limiting) to achieve the output torque request (e.g., WOP shift from M4 to M3) based on a plurality of factors associated with the output torque request to mitigate such undesirable perceptions.

Powertrain control can include controlling torque generation based upon an output torque request ($T_{O\_REQ}$) or a desired torque to be delivered to the output shaft of the powertrain. Output torque request and operator torque request will be used interchangeably herein. According to one exemplary control method, inputs from an operator are monitored by a control module, for example, including an accelerator pedal position, and the inputs are utilized to generate the $T_{O\_REQ}$. In another exemplary control method, inputs from the operator monitored by the control module can include brake pedal position. The time history of the accelerator pedal position and brake pedal position can be monitored. Depending upon the particular powertrain, the output torque request can be used by various control modules, including a transmission control module, a hybrid control module, an engine control module, or a motor control module, to command the various components to the powertrain to deliver torque to the output shaft according to the output torque request. Motors of a hybrid drive powertrain or an electric drive powertrain receive torque commands from a control module and operate based upon those torque commands. Accordingly, the control module can be configured to monitor a plurality of factors associated with the output torque request. Specifically, in response to an output torque request rate of change, the plurality of factors monitored include elapsed time beginning when the output torque request rate of change was detected, a magnitude of change of the output torque request and an output torque request time rate of change. A request busyness indicator can be determined as a function of the plurality of factors.

The present disclosure is not limited to the exemplary hybrid and electric drive powertrains discussed above. The methods can be equally applicable to powertrains utilizing conventional gasoline and diesel engines, fuel cell vehicles, conventional vehicles and hydraulic hybrid vehicles.

It is appreciated that an operator torque request can exceed an output torque constraint, or threshold output torque capability. The threshold output torque capability includes one of a maximum or minimum amount of output torque capability of a powertrain as a function for example of battery power limits, clutch reactive torque limits and motor torque limits. Therefore, for a delivered output torque to achieve the output torque request, the output torque capability may need to be adjusted to enable the powertrain to carry out the output torque request. For instance, the output torque capability varies during shift sequences in the powertrain. As such, the threshold output torque capability as a function of battery power limits, clutch reactive torque limits and motor torque limits can be monitored and compared to the operator torque request. If the threshold output torque capability is insufficient for carrying out the operator torque request, the threshold output torque capability of the powertrain to carry out the operator torque request can be adjusted (e.g., by shifting). For example, the output torque capability may require an increase to carry out a sudden increased operator torque request. In another example, the output torque capability may require a decrease to carry out a sudden decreased operator torque request. As will become apparent, rate limiting can be applied to the delivered output torque to compensate for time delays associated with any adjustments to the threshold output torque capability (i.e., the output torque constraint) to carry out the operator torque request. Therefore, if the operator torque request exceeds the threshold output torque capability, the operator torque request can be constrained by an amount equal to the threshold output torque capability until the threshold output torque capability is adjusted to carry out the operator torque request.

Figure 3:
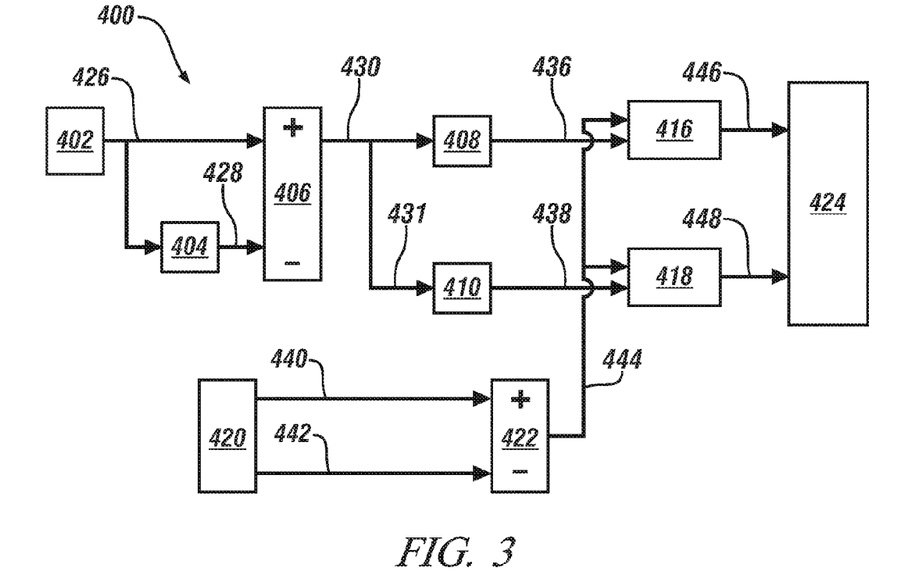
FIG. 3 illustrates an exemplary controller for controlling rate limiting of a delivered output torque to achieve an operator torque request based on a request busyness indicator in an exemplary powertrain, in accordance with the present disclosure.

FIG. 3 illustrates an exemplary controller 400 for controlling rate limiting of a delivered output torque to achieve an output torque request based on a request busyness indicator in an exemplary embodiment of the present disclosure. It will be appreciated that the delivered output torque is a propulsion torque that can include, but is not limited to, a transmission output torque, an axle torque or a crankshaft torque. The controller 400 can be a separate control module or can be integrated within another control module including a transmission control module, a hybrid control module, an engine control module, or a motor control module, to command the various components to the powertrain to deliver torque to the output shaft according to an output torque request. Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

In the exemplary embodiment, the controller includes an output torque request module (OTRM) 402, a delay unit 404, a request difference unit (RDU) 406, increase and decrease request busyness indicator modules (RBIM) 408,410, respectively, increase and decrease torque rate modules (TRM) 416, 418, respectively, a constrained torque request module (CTRM) 420, a torque constraint difference unit (TCDU) 422 and a delivered output torque module 424.

The OTRM 402 provides an output torque request ($T_{O\_REQ}$) 426. The $T_{O\_REQ}$ 426 can be in response to an operator input (e.g., via the accelerator pedal indicating an increase and the brake pedal indicating a decrease), monitored by the controller 400 via the OTRM 402. Operator inputs can further include inputs to a transmission range selector (e.g., PRNDL lever), inputs to cruise control switches and inputs to tap switches for manually shifting the vehicle. The $T_{O\_REQ}$ 426 is input to the RDU 406 and the delay unit 404, where the delay unit 404 outputs a delayed $T_{O\_REQ}$ 428 including a $T_{O\_REQ}$ from a previous loop or cycle that is input to the RDU 406. The RDU 406 determines whether the $T_{O\_REQ}$ is either a $T_{O\_REQ}$ increase 430 or a $T_{O\_REQ}$ decrease 431. If the $T_{O\_REQ}$ has not changed, both the $T_{O\_REQ}$ increase 430 and the $T_{O\_REQ}$ decrease 431 would be zero, and hence, the rate of change of the $T_{O\_REQ}$ would be zero. It will be appreciated that the RDU 406 detects the occurrence of an output torque request rate of change when either of the $T_{O\_REQ}$ increase 430 or the $T_{O_{13}REQ}$ decrease 431 are determined to not be zero.

If the RDU 406 determines the $T_{O\_REQ}$ 426 is an increase, the $T_{O\_REQ}$ increase 430 is input to the increase RBIM 408. If the RDU 406 determines the $T_{O\_REQ}$ 426 is a decrease, the $T_{O\_REQ}$ decrease 431 is input to the decrease RBIM 410. The RBIMs 408, 410 each monitor the plurality of factors associated with detecting respective output torque request rates of change (e.g., $T_{O\_REQ}$ increase 430 and a $T_{O\_REQ}$ decrease 431). Based on the monitored plurality of factors associated with the rate of change of the $T_{O\_REQ}$, the RBIMs 408,410 output request busyness indicators 436,438, respectively. The request busyness indicators 436,438 correspond to recent steadiness of respective output torque request rates of change (e.g., $T_{O\_REQ}$ increase 430 and a $T_{O\_REQ}$ decrease 431). In other words, each of the request busyness indicators 436,438 indicate how steady each respective output torque request rate of change has been recently. In a non-limiting embodiment, the request busyness indicator increases the more steady the output torque request has been recently.

Each RBIM 408,410 can include a look up table and a timer. The look up table can monitor the output torque request rate of change (e.g., operator torque request rate of change). The look-up table utilizes the timer to perform an execution rate of monitoring the output torque request rate of change. In an exemplary embodiment, calibrations to the timer can be one of incremented or decremented as a function of the output torque request rate of change. The lookup table can be a one-dimensional look-up table having one input and one output. The input of the look-up table can correspond to the monitored output torque request rate of change and the output of the look-up table can correspond to one of the timer increment or the timer decrement. For instance, the timer increment can be calibrated in a manner such that the execution rate of the look-up table is equal to an output torque request rate of change equal to zero. In a non-limiting example, when the look-up table execution rate is every 12.5 milliseconds, the timer increment would be 12.5 milliseconds when the output torque request rate of change is equal to zero. In an exemplary embodiment, the timer is decremented as the magnitude of the monitored output torque request rate of change increases. In an alternative embodiment, the timer can be calibrated in a manner where the output torque request rate of change is compared to an output torque request rate of change decrement threshold. For instance, and in a non-limiting example, if the output torque request rate of change is below an output torque request rate of change threshold, the timer can be incremented. In another non-limiting example, if the output torque request rate of change is greater than or equal to the threshold, the timer can be decremented by a calibratable amount, as a function of the output torque request rate of change. For instance, the $T_{O\_REQ}$ increase 430 rate of change can be greater than or equal to the threshold in response to a sudden tip-in to an accelerator pedal, thereby decrementing the timer. Likewise, the $T_{O\_REQ}$ decrease 431 rate of change can be greater than or equal to the threshold in response to a sudden tip-out from an accelerator pedal, thereby decrementing the timer.

Still referring to the RBIMs 408,410, the monitored plurality of factors associated with the output torque request rate of change (e.g., $T_{O\_REQ}$ increase 430 and a $T_{O\_REQ}$ decrease 431), or monitored request busyness indicator corresponding to recent steadiness of the operator torque request, includes elapsed time beginning when an output torque request rate of change is detected and monitoring a magnitude of change of the operator torque request rate of change. Another one of the monitored plurality of factors associated with the output torque request rate of change is the operator torque request time rate of change. A weighted factor respective to each of the monitored factors can be applied, where rate limiting of the delivered output torque can be influenced by each of the respective weighted factors. Rate limiting of the delivered output torque is discussed below with reference to the increase and decrease TRMs 416,418, respectively.

The CTRM 420 provides a constrained output torque request 440 and a delivered output torque 442 from a previous loop or cycle. The constrained output torque request 440 can take into consideration the threshold output torque capability discussed above including one of a maximum or minimum amount of output torque capability of the powertrain (e.g., hybrid drive or electric drive powertrain) as a function for example of battery power limits, clutch reactive torque limits and motor torque limits to achieve the output torque request. Accordingly, the constrained output torque request 440 provided by the CTRM 420 can be a predetermined quantity. In a non-limiting example, if the output torque request (e.g., operator torque request) exceeds the threshold output torque capability, the operator torque request is constrained by an amount equal to the threshold output torque capability until the threshold output torque capability is adjusted to carry out the operator torque request. The constrained output torque request 440 and the delivered output torque 442 from a previous loop or cycle are input to the TCDU 422 which determines an output torque difference 444 that is input to either of the increase or decrease TRMs 416,418, respectively. Accordingly, the output torque difference 444 determines the amount of delivered output torque still required to achieve the constrained output torque request during the current loop or cycle. As such, the output torque difference 444 can be a predetermined quantity that is input to either of the increase or decrease TRMs 414,418, respectively.

The increase TRM 416 determines a rate limit 446 for a delivered output torque increase based on the request busyness indicator 436 and the output torque difference 444. Likewise, the TRM 418 determines a rate limit 448 for a delivered output torque decrease based on the request busyness indicator 438 and the output torque difference 444. As aforementioned, rate limiting of the delivered output torque can be influenced by each of the respective weighted factors of the request busyness indicator. It will be understood that decreasing a magnitude of a rate limit that is applied to a delivered output torque corresponds to increasing the amount of rate limiting. Similarly, increasing the magnitude of the rate limit that is applied to the delivered output torque corresponds to decreasing the amount of rate limiting.

It will be appreciated, that monitoring a request busyness indicator corresponding to recent steadiness of the operator torque request and controlling a delivered output torque time rate of change to achieve the operator torque request based on the request busyness indicator can effectively reduce shift time by enabling a faster shift because shift time does not need to be increased in order to reduce the severity of sudden changes in the delivered output torque when the operator torque request has recently been relatively steady.

In an exemplary embodiment, when the request busyness indicator 436,438 indicates that the monitored elapsed time beginning when the output torque request rate of change was detected is less than a threshold time, no rate limiting can be applied to the delivered output torque to achieve the output torque request. In a non-limiting example, the threshold time is 0.4 seconds. Because the elapsed time is less than the threshold time, a sudden change in output torque is acceptable because the operator recently requested the output torque. Hence, the period of dead pedal is short. Further, when the monitored elapsed time beginning when the output torque request rate of change was detected is less than the time threshold, the delivered output torque is controlled using a rate corresponding to the output torque request rate of change.

In another exemplary embodiment, when the request busyness indicator 436,438 indicates the monitored output torque request time rate of change is faster than an output torque request time rate of change threshold, rate limiting of the delivered output torque to achieve the output torque request can be decreased. Hence, the weighted factor of the monitored output torque request time rate of change can be given a higher factor, or more weight, when an operator tips-in to an accelerator pedal quickly, and thereby decreasing the rate limiting (i.e., a faster time rate of change) of the delivered output torque. Likewise, when the request busyness indicator 436,438 indicates the monitored output torque request time rate of change is slower than the threshold time rate of change, the rate limiting of the delivered output torque to achieve the output torque request can be increased. Hence, the weighted factor of the monitored output torque request time rate of change can be given a lower factor, or less weight, when an operator tips-in to an accelerator pedal gradually, and thereby increasing the rate limiting (i.e., a slower time rate of change). The weighted factor of the monitored output torque request time rate of change can be referred to as gain scheduling allowing discrimination between quick tip-ins having fast time rates of change and gradual tip-ins having slow time rates of change.

In another exemplary embodiment, the delivered output torque time rate of change (i.e., rate limiting) can be controlled based on an amount proportional to the monitored magnitude of change of the operator torque request rate of change. For instance, the request busyness indicator 436 can change by an amount that is proportional to the monitored magnitude of change of the $T_{O\_REQ}$ increase 430 rate of change. Likewise, the request busyness indicator 438 can change by an amount that is proportional to the monitored magnitude of change of the $T_{O\_REQ}$ decrease 431 rate of change. Therefore, the weighted factor of the monitored magnitude of change of the operator torque request rate of change can be given a lower factor, or less weight, when the magnitude of change is small, thereby increasing the rate limiting (i.e., a slower time rate of change) of the delivered output torque because the magnitude of change is small. Likewise, the weighted factor of the monitored magnitude of change of the operator torque request rate of change can be given a higher factor, or more weight, when the magnitude of change is large, thereby decreasing the rate limiting (i.e., a faster time rate of change) of the delivered output torque because the magnitude of change is large. In other words, operator torque request rates of change having lower magnitudes of change result in more rate limiting of the delivered output torque than operator torque requests having higher magnitudes of change when the operator torque request time rate of change is identical for each of the magnitudes. In a non-limiting example, a quick tip-in to the accelerator pedal indicating a 50 Nm operator torque request increase results in more, or increased, rate limiting of the delivered output torque than a quick tip-in to the accelerator pedal indicating a 500 Nm operator torque request increase provided that the operator torque request time rates of change for each of the magnitudes are identical. The monitored operator torque request time rate of change can further be taken into consideration. For instance, when the monitored output torque request time rate of change is faster than a threshold time rate of change, the controlled delivered output torque time rate of change can be increased (i.e., a faster time rate of change). Thus, allowing discrimination for quick tip-ins having fast time rates of change. Likewise, when the monitored output torque request time rate of change is slower than the threshold time rate of change, the controlled delivered output torque time rate of change can be decreased (i.e., a slower time rate of change). Thus, allowing discrimination for gradual tip-ins having slower time rates of change.

Figure 4:
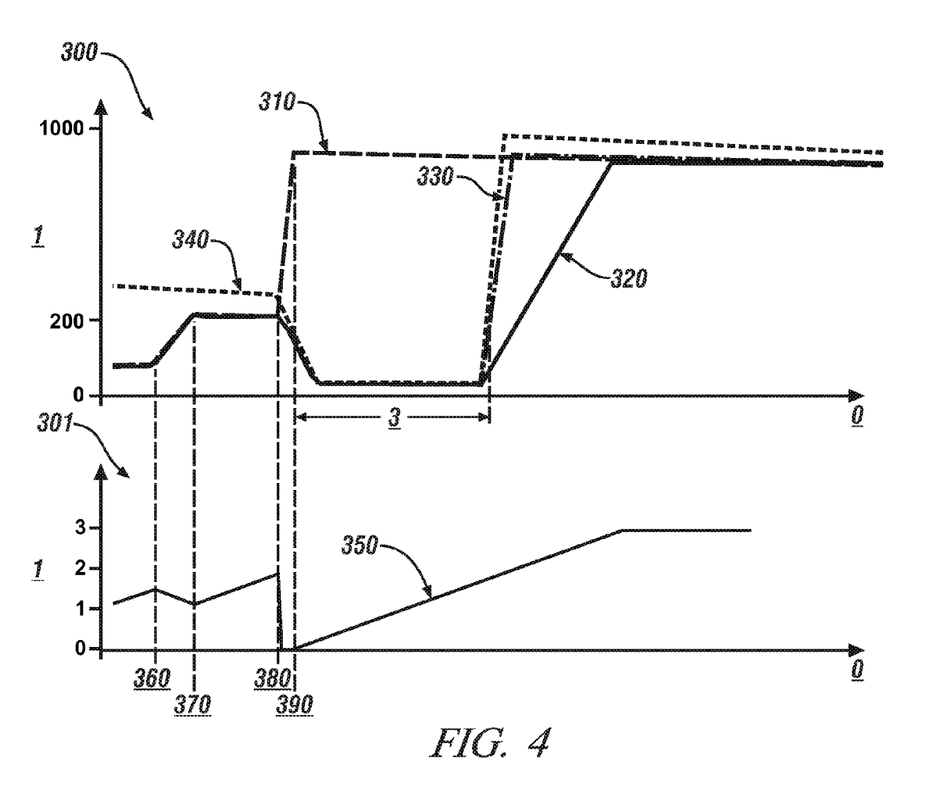
FIG. 4 illustrates a first graph including an operator torque request profile, an output torque capability profile, a delivered output torque profile without rate limiting and a rate-limited delivered output torque profile; and a second graph illustrating a request busyness indicator profile associated with the operator torque request profile of the first graph in accordance with the present disclosure.

FIG. 4 illustrates a first graph 300 including an operator torque request profile 310, an output torque capability profile 340, a delivered output torque profile 330 without rate limiting and a rate-limited delivered output torque profile 320; and a second graph 301 illustrating a request busyness indicator profile 350 associated with the operator torque request profile 310 of the first graph 300 in accordance with the present disclosure. Dashed vertical lines correspond to times 360, 370, 380 and 390 through the first and second graphs 300, 301, respectively, indicate where changes occur in the operator torque request profile 310 and changes to the request busyness indicator profile 350 in response to the operator torque request profile 310. Referring to the first graph 300, the horizontal axis 0 denotes time and the vertical axis 1 denotes torque. Referring to the second graph 301, both the horizontal axis 0 and the vertical axis 1 denote time.

The operator torque request profile 310 is substantially constant, or relatively steady, until time 360, where an increased operator torque request occurs until time 370. Accordingly, the request busyness indicator profile 350 increases up until time 360 because the operator torque request is deemed relatively steady. However, the request busyness indicator profile 350 gradually decreases between times 360 and 370 because the operator torque request is currently increasing (e.g., an operator torque request rate of change has occurred between times 360 and 370). Between times 370 and 380, the operator torque request profile 310 is substantially constant, or relatively steady. Accordingly, the request busyness indicator profile 350 gradually increases between times 370 and 380. Up until time 380, the delivered output torque profile 330 follows the operator torque request profile 310 because all of the output torque requests' rates of change thus far have been relatively gradual. Further, the output torque capability profile 340 is sufficient for carrying out all instantaneous operator torque requests thus far.

Between times 380 and 390 an operator torque request increase occurs. Here, the operator torque request profile 310 suddenly increases and the request busyness indicator profile 350 suddenly decreases to substantially zero in response to the sudden increase in the operator torque request profile 310. The output torque capability profile 340 of the powertrain is currently insufficient, and will require an adjustment to carry out the increased operator torque request as a function of battery power limits, clutch reactive torque limits and motor torque limits. In a non-limiting example, the increased operator torque request rate of change illustrated between times 380 and 390 indicates a mode tip-in shift during wide open pedal position from Mode 4 to Mode 3 in the exemplary electric drive powertrain 105 shown in FIG. 2. As aforementioned, the shift from M4 to M3 requires the shift to be sequenced as M4-M2-G1-M1-M3, where selected combinations of clutches C1, C2 and C3 are engaged, as described with reference to Table 2. The operator torque request profile 310 is substantially constant, or relatively steady, beyond time 390. However, the maximum output torque capability must be increased to carry out the sudden increase in operator torque request, and thus, where the shift from M4 to M3 of the non-limiting example is required. At detection of the increased operator torque request at time 380, portions of the powertrain are disengaged where the output torque capability profile 340 decreases to substantially zero, and the delivered output torque profiles 320,330, respectively, accordingly follow.

A "3" along the horizontal axis 0 of the first graph 300 denotes a period of time (i.e., monitored elapsed time) between the end of the sudden increased operator torque request at time 390 and a time where the maximum output torque capability is increased to carry out the sudden increase in the operator torque request. In the non-limiting example, the period of time 3 ends when the powertrain 104 enters Gear 1, where the maximum amount of output torque capability delivered by the powertrain increases suddenly, as illustrated by the output torque capability profile 340. It will be appreciated that the period of time 3 can be the "dead pedal" period where the driver does not experience any changes in delivered output torque even though an output torque request rate of change has occurred. When the period of time (i.e., elapsed time) 3 beginning when the sudden increased output torque request rate of change was detected (e.g., at time 390) is less than a period of time threshold (i.e., elapsed time threshold), the delivered output torque time rate of change (i.e., rate limiting) uses a rate corresponding to the operator torque request rate of change, as indicated by the delivered output torque profile 330. Alternatively, the delivered output torque can use a rate corresponding to the rate of change of the sudden increased maximum amount of output torque capability. In other words, no rate limiting of the delivered output torque is applied to achieve the output torque request because the output torque capability to carry out the increased operator torque request arrived soon after the operator made the request. In the non-limiting example, the period of time threshold (i.e., elapsed time threshold) is 0.4 seconds. However, when the period of time (i.e., elapsed time) 3 beginning when the output torque request rate of change was detected is at least the period of time threshold (i.e., elapsed time threshold), the delivered output torque time rate of change (i.e., rate limiting) applies the weighted factor respective to each of the monitored factors associated with the request busyness indicator discussed above, where the delivered output torque rate limiting is influenced by each of the respective weighted factors. Accordingly, the rate-limited delivered output torque profile 320 is utilized. For instance, heavy rate-limiting to the rate-limited delivered output torque profile 320 can be applied when the output torque capability suddenly increases after a lot of time has elapsed since the operator torque request changed. Further, the request busyness indicator profile 350 increases beyond time 390 in response to the operator torque request being substantially constant, or relatively steady. It is understood, that the rate-limited delivered output torque reduces an undesirable sudden increase, or jarring, in delivered output torque perceivable to the driver after a period of dead pedal. It will be appreciated that the request busyness indicator can be saturated when a calibratable value is reached, as indicated by the request busyness indicator profile 350 on the far right of the second graph 350.

It is appreciated that an instantaneous operator torque request rate of change determines an instantaneous rate of change of a rate limit that is applied to the delivered output torque. Hence, the instantaneous derivative of the rate limit is dictated by the operator torque request rate of change. It will be understood that decreasing a magnitude of a rate limit corresponds to increasing the amount of rate limiting. In other words, decreasing the magnitude of the rate limit results in slower delivered output torque time rates of change. In a non-limiting example, if the instantaneous operator torque request time rate of change is zero, the rate limit of the delivered output torque can be equal to a previous rate limit of the delivered output torque minus a positive calibration, where the rate limit of the delivered output torque has a threshold it cannot go below. In another non-limiting example, if the instantaneous operator torque request rate of change is large and positive, the rate limit of the delivered output torque can be equal to a previous rate limit of the delivered output torque plus a positive calibration, where the rate limit of the delivered output torque has a threshold it cannot go above. In yet another non-limiting example, if the instantaneous operator torque request rate of change is small and positive, the rate limit of the delivered output torque can be equal to a previous rate limit of the delivered output torque.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling torque in a vehicle including a control module, the control module configured to execute the following steps, comprising:
    monitoring one of an accelerator pedal position and a brake pedal position to determine an output torque request;
    monitoring a plurality of factors associated with the output torque request in response to an output torque request rate of change, the output torque request rate of change corresponding to a rate of change between the output torque request that is one of increased and decreased from an output torque request of a previous iteration; and
    controlling rate limiting of a delivered output torque to achieve the output torque request rate of change based on the plurality of factors associated with the output torque request, the controlled rate limiting of the delivered output torque comprising one of the output torque delivered at a rate faster than the output torque request rate of change and the output torque delivered at a rate slower than the output torque request rate of change.

2. The method of claim 1 wherein the plurality of factors associated with the output torque request comprises:
    an elapsed time beginning when the output torque request rate of change exceeded the predetermined threshold; and
    a magnitude of change in the output torque request, the magnitude of change comprising a magnitude of torque between the output torque request and the output torque request from the previous iteration.

3. The method of claim 2 wherein the plurality of factors associated with the output torque request further comprises:
    an output torque request time rate of change corresponding to a time rate of change between the output torque request and the output torque request of the previous iteration.

4. The method of claim 3 wherein controlling rate limiting of the delivered output torque comprises:
    when the monitored elapsed time is less than a threshold time, applying no rate limiting to the delivered output torque to achieve the output torque request rate of change.

5. The method of claim 2 wherein controlling rate limiting of the delivered output torque comprises:
    applying rate limiting in proportion to the magnitude of change in the output torque request.

6. The method of claim 3 wherein controlling rate limiting of the delivered output torque comprises:
    when the output torque request time rate of change exceeds an output torque request time rate of change threshold, decreasing rate limiting of the delivered output torque resulting in the output torque delivered at a rate faster than the output torque request rate of change; and
    when the monitored output torque request time rate of change does not exceed the output torque request time rate of change threshold, increasing rate limiting of the delivered output torque resulting in the output torque delivered at a rate slower than the output torque request rate of change.

7. The method of claim 1 further comprising:
    when a magnitude of the output torque request rate of change is at least an output torque request rate of change threshold, decrementing a timer associated with monitoring a time history of the output torque request rate of change.

8. The method of claim 1 wherein the output torque request rate of change corresponds to an accelerator pedal tip-in.

9. The method of claim 1 wherein the output torque request rate of change corresponds to an accelerator pedal tip-out.

10. Method for controlling torque in a vehicle powertrain in response to an operator torque request rate of change, the vehicle including a control module configured to execute the following steps, comprising:
   monitoring one of an accelerator pedal position and a brake pedal position to determine an output torque request;
   when the output torque request is one of increased and decreased from an output torque request of a previous iteration, monitoring a request busyness indicator corresponding to recent steadiness of the operator torque request rate of change corresponding to a rate of change between the output torque request and the output torque request of the previous iteration comprising:
      monitoring an elapsed time beginning when the output torque request rate of change was detected;
      monitoring a magnitude of change of the operator torque request, the magnitude of change comprising a magnitude of torque between the output torque request and the output torque request from the previous iteration;
      monitoring an operator torque request time rate of change; and
   controlling rate limiting of a delivered output torque to achieve the operator torque request rate of change based on the request busyness indicator, the controlled rate limiting of the delivered output torque comprising one of the output torque delivered at a rate faster than the output torque request rate of change and the output torque delivered at a rate slower than the output torque request rate of change.

11. The method of claim 10 wherein controlling the rate limiting of the delivered output torque comprises:
   when the elapsed time is less than an elapsed time threshold, controlling the rate limiting of the delivered output torque using a rate corresponding to the operator torque request rate of change.

12. The method of claim 10 wherein controlling the rate limiting of the delivered output torque comprises:
   controlling the rate limiting of the delivered output torque proportionally to the magnitude of change of the operator torque request.

13. The method of claim 12 wherein controlling the rate limiting of the delivered output torque comprises:
   when the operator torque request time rate of change exceeds an output torque request time rate of change threshold, decreasing the controlled rate limiting of the delivered output torque resulting in the output torque delivered at a rate faster than the output torque request rate of change; and
   when the time rate of change of the torque request does not exceed the output torque request time rate of change threshold, increasing the controlled rate limiting of the delivered output torque resulting in the output torque delivered a rate slower than the output torque request rate of change.

14. The method of claim 10 wherein the operator torque request rate of change comprises an accelerator pedal input.

15. The method of claim 10 wherein the operator torque request rate of change comprises a brake pedal input.

16. The method of claim 10 further comprising:
   monitoring a threshold output torque capability comprising one of a maximum and minimum amount of output torque capability of the powertrain;
   comparing the threshold output torque capability to the operator torque request; and
   if the operator torque request exceeds the threshold output torque capability, constraining the operator torque request to the threshold output torque capability until the threshold output torque capability is adjusted to carry out the operator torque request.

17. Apparatus for controlling torque in a vehicle in response to an operator torque request rate of change, comprising:
   a control module configured to execute the following steps, comprising:
   monitoring one of an accelerator pedal position and a brake pedal position to determine an output torque request;
   when the output torque request is one of increased and decreased from an output torque request of a previous iteration, monitoring a request busyness indicator corresponding to recent steadiness of the operator torque request rate of change corresponding to a rate of change between the output torque request and the output torque request of the previous iteration comprising:
      monitoring an elapsed time beginning when the output torque request rate of change was detected;
      monitoring a magnitude of change of the operator torque request, the magnitude of change comprising a magnitude of torque between the output torque request and the output torque request from the previous iteration; and
      monitoring an operator torque request time rate of change; and
   controlling rate limiting of a delivered output torque to achieve the operator torque request rate of change based on the request busyness indicator, the controlled rate limiting of the delivered output torque comprising one of the output torque delivered at a rate faster than the output torque request rate of change and the output torque delivered at a rate slower than the output torque request rate of change.

* * * * *